United States Patent [19]

Guhl et al.

[11] 4,004,665
[45] Jan. 25, 1977

[54] TRANSMISSION AND PARKING BRAKE CONTROL SYSTEM

[75] Inventors: Richard E. Guhl; Charles W. Oswald, both of Decatur, Ill.

[73] Assignee: Caterpillar Tractor Co., Peoria, Ill.

[22] Filed: Dec. 4, 1975

[21] Appl. No.: 637,607

[52] U.S. Cl. .......................... 192/4 A; 74/471 XY
[51] Int. Cl.² .................. B60K 29/02; F16H 57/10
[58] Field of Search ................ 192/4 A, 4 B, 4 C; 74/471 XY, 473 P, 477

[56] References Cited

UNITED STATES PATENTS

| | | | |
|---|---|---|---|
| 2,026,220 | 12/1935 | Denker | 192/4 A |
| 2,910,156 | 10/1959 | Apple | 192/4 A X |
| 3,184,989 | 5/1965 | Rhodes | 74/471 XY |
| 3,400,790 | 10/1968 | Ruhl et al. | 192/4 C X |
| 3,463,278 | 10/1969 | Broeker et al. | 192/4 R |
| 3,621,956 | 11/1971 | Suckow | 192/4 A |
| 3,923,129 | 12/1975 | Rusch et al. | 192/4 B |

*Primary Examiner*—Benjamin W. Wyche
*Attorney, Agent, or Firm*—Charles E. Lanchantin, Jr.

[57] ABSTRACT

A transmission and parking brake control system for a vehicle is disclosed including a brake for inhibiting movement of the rotary drive train thereof, a transmission shiftable between neutral and a plurality of speed range drive conditions for operation of the vehicle, a transmission control arrangement operatively connected to the transmission for selectively establishing the neutral and the drive conditions including a lever assembly shiftable substantially in a plane for selecting the drive conditions and shiftable normal to the plane at the neutral condition into a parking condition, and a brake arrangement operatively connected to the brake for engagement and disengagement thereof, the brake arrangement including an actuator which is responsive to movement of the lever assembly into the parking condition for affecting remote engagement of the brake without mechanical interconnecting linkage or the like.

2 Claims, 3 Drawing Figures

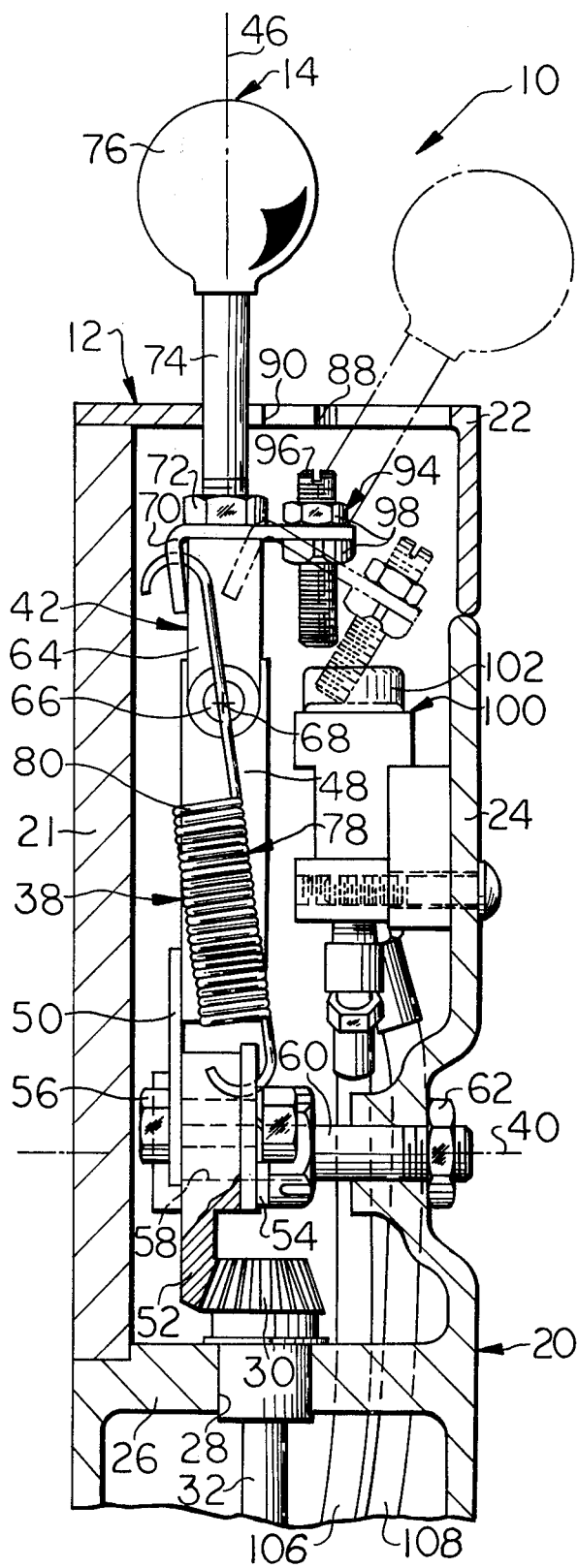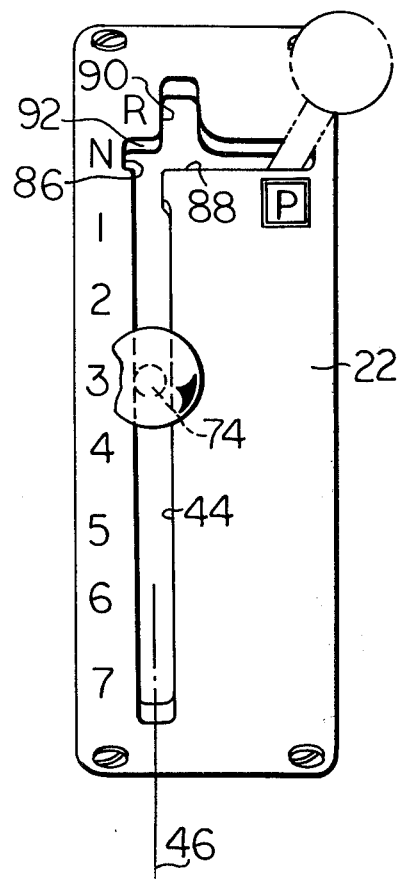

TRANSMISSION AND PARKING BRAKE CONTROL SYSTEM

BACKGROUND OF THE INVENTION

Vehicles having an operator's control console with one or more control levers for selectively shifting the transmission into neutral and a plurality of speed range drive conditions, and with at least one separately actuated parking brake device are known in the art. However, these transmission and parking brake control arrangements have heretofore been relatively complicated and expensive. Specifically, they must insure that the transmission is not placed in a driving gear with the parking brake inadvertently engaged, or vice versa. In order to achieve this, complex interlocks or inhibitors are utilized, or the system is constructed in such a manner that the parking brake is automatically released when the transmission lever is shifted out of a neutral condition. Alternately, some arrangements force the transmission shift lever to neutral when the parking brake is engaged. Most of these prior art arrangements include at least two separate levers or control devices that must be simultaneously positioned with close attention by the operator. This is time-consuming and bothersome.

Partly overcoming the aforementioned problems are the transmission and parking brake control systems which utilize a single control lever and which are represented by U.S. Pat. No. 3,242,758 to K. J. Harris et al on Mar. 29, 1966 and U.S. Pat. No. 3,601,231 to F. Kolacz et al on Aug. 24, 1971. However, both of the reference systems are too costly in their construction and embody complicated mechanical linkage arrangements intermediate the transmission control lever and a parking brake actuating mechanism. As a result, these systems are subject to malfunction due to wear and adjustment problems, and require the frequent services of an expert mechanic.

SUMMARY AND OBJECTS OF THE INVENTION

Accordingly, it is an object of the present invention to provide a relatively economical and reliable vehicle control system for selecting the neutral and drive conditions of a transmission as well as for engaging a remotely disposed brake solely when the transmission control lever is placed in a parking condition.

It is another object of the invention to provide such a control system which assures automatic release of the brake when the control lever is shifted into neutral or a drive condition.

It is another object to provide a transmission and parking brake control system of the character described which will utilize only a single control lever for actuation of the transmission and to apply the brake when parking for ease of operation with a reduction of operator effort and motion over existing control systems.

It is another object to provide a control of the above-mentioned type which eliminates complicated mechanical linkage intermediate the control lever arrangement and a remotely disposed brake.

Other objects and advantages of the present invention will become more readily apparent upon reference to the accompanying drawings and the following description.

BRIEF DESCRIPTION OF THE DRAWINGS

FIG. 2 is an enlarged transverse sectional view of the operator's control console shown in FIG. 1 taken along the lines II—II thereof, and showing the control lever assembly repositioned to neutral in solid lines.

FIG. 3 is a top plan view of the operator's control console shown in FIGS. 1 and 2.

DESCRIPTION OF THE PREFERRED EMBODIMENT

Figure 1:
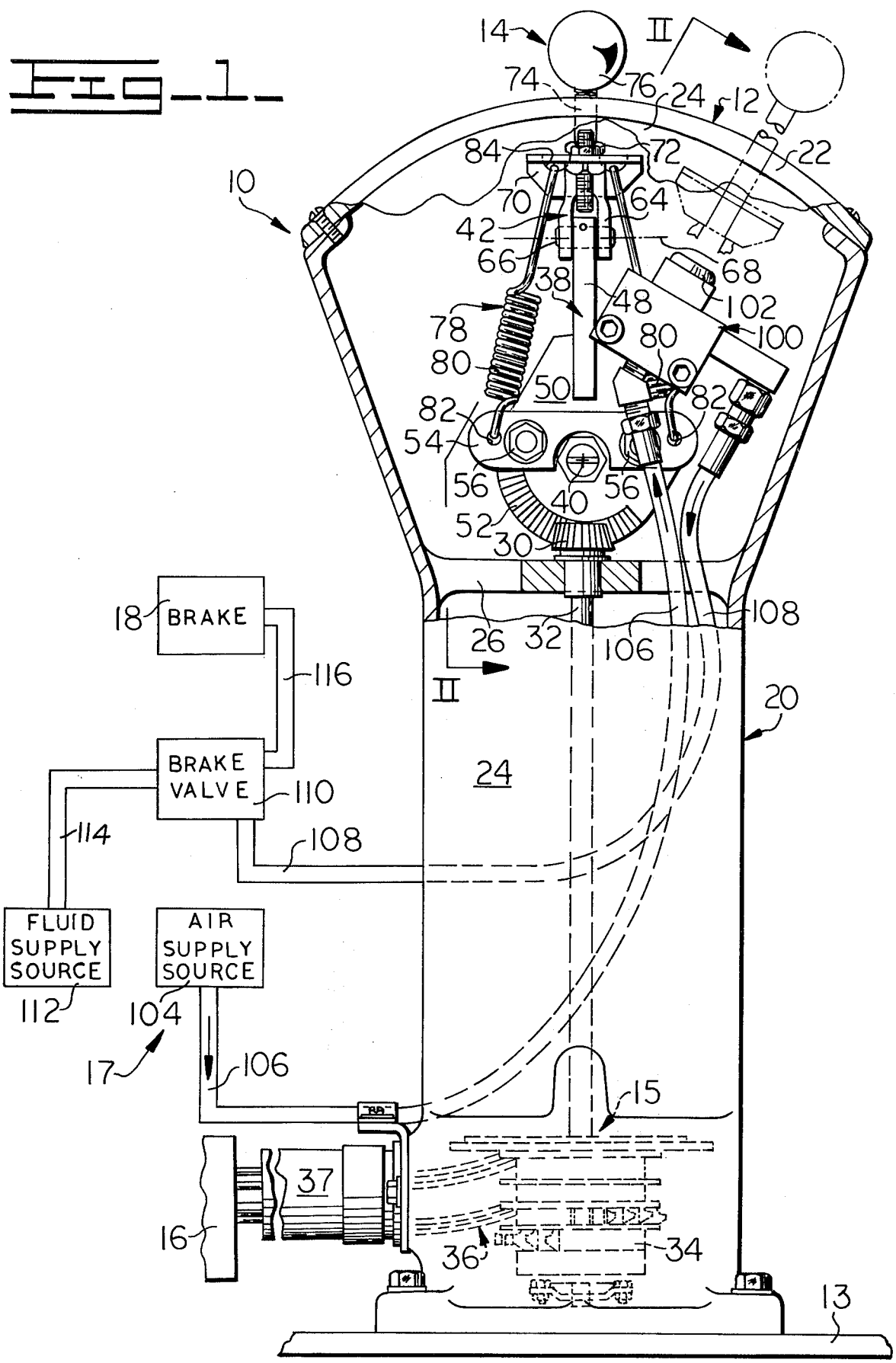
FIG. 1 is an elevational side view of the transmission and parking brake control system of the present invention with portions of an operator's control console broken open to better show details thereof, and with other portions shown in schematic box form for illustrative convenience.

The preferred embodiment of the subject invention illustrated in FIGS. 1 and 2 includes a transmission and parking brake control system 10 having an operator's control console 12 that is beneficially preassembled prior to its being installed on a vehicle 13, such as an earthmoving machine or the like. The control console includes a single control lever assembly 14 adapted to selectively establish the neutral and drive conditions of a transmission control arrangement 15 operatively communicating with a conventional multi-speed transmission 16 disposed in series with the vehicle's rotary drive train. Furthermore, the control lever assembly is adapted to be selectively communicated with a brake control arrangement 17 in a parking mode of operation for establishing the engagement of a spring-applied and pressure released brake 18 and for inhibiting movement of the vehicle or drive train when the transmission is in neutral.

The control console 12 includes an upstanding housing 20 having a removable side cover 21 providing access to the control lever assembly 14, a combined top cover and control lever guiding plate 22, an outside wall 24 and an internal horizontally disposed wall 26 with a vertically oriented bore 28 therethrough. A transmission control actuating pinion gear 30 is rotatably supported within the bore of the internal wall and is secured to an associated shaft which descends through the housing to engage and operate an electrical switching mechanism 34 as shown in broken lines in the lower portion of FIG. 1. A wiring harness 36 operatively interconnects this switching mechanism with a transmission control apparatus 37. In this way, rotation of the pinion gear and descending shaft rotates the switching mechanism to effectively provide various operating signals to the transmission control apparatus for establishing the neutral and the drive-establishing conditions of the remotely disposed transmission 16.

As illustrated in larger scale in FIG. 2, the control lever assembly 14 of the present invention includes a lower portion 38 which is adaptable to pivotally rotate about a transverse axis 40 when an upper portion 42 thereon is moved substantially longitudinally in an elongated opening 44 in the guiding plate 22 as is also shown in FIG. 3. In the exemplary embodiment illustrated, seven forward speeds may be progressively selected in downward progression as the control lever is moved forwardly in a generally upright plane 46 to the neutral position identified by the letter N.

More specifically, the lower portion 38 of the control lever assembly 14 includes an upstanding arm 48, a back-up plate 50 integrally secured to the arm, an arcuate segment of a bevel gear 52 and a spring mounting plate 54. As is clearly illustrated, the bevel gear segment and the spring mounting plate are removably secured to the back-up plate by a pair of fastening devices or bolt arrangements 56, while the bevel gear segment has a bore 58 therethrough so that the entire lower portion may be pivotally mounted on the smooth peripheral surface of a bolt 60 extending laterally through the bore thereof. The bolt 60 is oriented on the transverse axis 40 and is threadably secured to the outside wall 24 and locked in place by a nut 62.

The upper portion 42 of the control lever assembly 14 includes a yoked arm 64 which is rockably secured to the upstanding arm 48 of the lower portion 38 by way of a pivot pin 66. The pivot pin has an axis 68 generally disposed in the upright plane 46 and at right angles to the transverse axis 40 so that the upper portion of the lever assembly can rock laterally outwardly from the operator within the limits of the guiding plate 22 or to the right when viewing FIG. 2, to the phantom line condition shown. An L-shaped plate 70 is suitably secured to the top of the yoked arm as by being entrapped by a locking nut 72 secured to an upstanding control rod 74. In turn, the control rod is threadably inserted in the yoked arm at its lower extremity, and extends upwardly through the opening 44 and outwardly of the console housing 20 to terminate with a control knob 76.

In accordance with one of the features of the present invention, an over-center spring mechanism, identified generally by the reference numeral 78, is disposed intermediate the lower portion 38 and the upper portion 42 of the control lever assembly 14. Specifically, the mechanism includes a pair of coiled springs 80 which are anchored at longitudinally spaced openings 82 formed in the mounting plate 54 at their lower ends and are anchored at similarly spaced openings 84 formed in the L-shaped plate 70 at their upper ends. The springs are anchored in tension in such a way with respect to their aligned relationship with the axis 68 that the upper portion of the lever assembly is biased to the left when viewing FIG. 2 and toward the inner edge of the guide opening 44 when the lever assembly is operating along the plane 46.

Pursuant to the invention, an adjustable device or projection 94 is secured in a depending manner to the L-shaped plate 70. The projection includes a threaded screw 96 which extends through the plate and is mountably locked thereto by a pair of nuts 98. This projection is adapted to engage an air actuator valve 100 which is suitably secured to the outside wall 24 of the console housing 20. This mechanically actuated air valve is normally open and is referred to as a Versa series "B" valve supplied by Versa Products Company, Inc., of Englewood, N.J. Basically, an upwardly biased piston 102 is disposed within the actuator valve and is movable from a normally open position to a blocking position. In its open position air is permitted to flow from an air supply source 104 and a supply conduit 106 through the valve and to be thereafter directed to an air delivery or control signal line 108 communicating with a brake valve 110. The brake valve is a conventional air operated oil valve and is supplied with pressurized fluid from a supply source 112 by way of a control conduit 114 of the brake control arrangement 17 in the usual manner so that pressurized fluid at a predetermined pressure may be directed by the brake valve to the brake 18 for disengagement thereof through an interconnecting conduit 116.

OPERATION

While the construction of the present invention is believed clearly apparent from the foregoing description, further amplification will subsequently be made in the following brief summary of such operation. With the control rod 74 of the control lever assembly 14 disposed within the neutral branch opening 86, the interconnected pinion gear 30 and bevel gear segment 52 has rotated the depending shaft 32 to place the switching mechanism 34 in neutral. Electrical signals are then communicated by way of the wiring harness 36 to the transmission control apparatus 37 and the transmission 16 to place it in a neutral mode of operation. At the same time that the transmission control arrangement 15 is disposed in neutral, the brake control arrangement 17 is disposed in its brake disengaged condition in the following manner. Pressurized air from the supply source 104 is communicated to the brake valve 110 by way of the conduit 106, the air actuator valve 100, the air delivery line 108, while pressurized hydraulic fluid is simultaneously communicated to the brake valve from the supply source 112. The spring-applied and pressure released brake 18 is subsequently supplied with this fluid by way of the conduit 116 because of the air pressure control signal supplied to the brake valve through the air delivery line 108.

When the control lever assembly 14 is manipulated out of the neutral branch opening 86 and longitudinally toward the operator within the opening 44 of the guiding plate 22 any one of a plurality of forward drive conditions are provided. As shown in solid lines in FIG. 1, the control rod 74 is positioned to select third forward gear. As the control rod is moved from the neutral condition shown in phantom to this condition, both the upper portion 42 and lower portion 38 travel together in a substantially counterclockwise manner about the axis 40 when viewing FIG. 1. Simultaneously therewith, the bevel gear segment 52 is also rotated in a counterclockwise manner. This rotates the pinion gear 30 and descending shaft 32 to cause the switching mechanism 34 to appropriately signal the transmission control apparatus 37 for a third gear mode of operation. The normally disengaged mode of operation of the brake control arrangement 17 and brake 18 is not affected under these conditions.

Movement of the control rod 74 to the reverse branch opening 90 merely rotates the bevel gear segment 52 in a clockwise direction from the third forward gear position described above to place the switching mechanism 34 in a position wherein a reverse mode of operation is called for.

In accordance with the invention, however, movement of the control rod 74 into the parking branch opening 88 as shown in phantom in FIGS. 2 and 3 substantially corresponds to the neutral condition described above insofar as the mode of operation of the transmission control arrangement 15 is concerned. However, while the lower portion 38 of the control lever assembly 14 remains in the same relative rotary position as in neutral (N), the upper portion 42 moves relative thereto to physically engage the actuator valve 100 and to thus affect the mode of operation of the brake control arrangement 17. Specifically, when the control rod is moved into the parking branch opening the upper portion pivots about the axis 68 so that the depending projection 94 affixed thereto makes contact with the piston 102 to urge it downwardly as best visualized with reference to FIG. 2. Under these circumstances, the conduit 106 is blocked and the air delivery line 108 is exhausted to the atmosphere by way of the actuator valve to thereby depressurize the control signal to the brake valve 110. This results in depressurizing of the fluid in the conduit 116 communicating with the vehicle brake 18 and subsequently allows automatic engagement thereof.

DESCRIPTION OF AN ALTERNATE EMBODIMENT

It is clearly apparent that the control system of the present invention can be utilized to engage a pressure-applied and spring-released brake in place of the spring-applied and pressure released brake 18 described above without departing from the spirit of the present invention. In such an instance, a normally closed actuator valve could be used as a replacement for the aforementioned actuator valve 100 so that only when the control lever assembly is selectively positioned in the parking branch opening 88 would that valve allow fluid pressure to be supplied to the brake for engagement thereof.

It is therefore apparent that the transmission and parking brake system of the present invention provides an economical and reliable control system for selecting the neutral and the drive establishing conditions of a transmission as well as for engaging a remotely disposed brake solely when the single control lever assembly is placed in a parking mode of operation. Moreover, when the control lever assembly is moved from the parking position to a neutral position or to any drive establishing condition, automatic release of the brake is assured in a positive manner and without undue attention by the vehicle operator. Advantageously, the control lever assembly of the present invention includes a spring biasing mechanism which holds the control rod in park or in a laterally opposite position corresponding to neutral without the necessity of applying continuous manual effort thereto.

While the invention has been described and shown with particular reference to a preferred embodiment, it will be apparent that variations might be possible, such as the alternate embodiment briefly described above, that would fall within the scope of the present invention which is not intended to be limited except as defined in the following claims.

What is claimed is:

1. A transmission and brake control system comprising;
    a rotary drive train including a transmission shiftable between neutral and a plurality of drive conditions for operation of said drive train;
    a brake for inhibiting movement of said drive train;
    a transmission control arrangement operatively connected to said transmission for selectively establishing said neutral and said drive conditions including a single control lever assembly shiftable in a plane for selecting said drive conditions and shiftable normal to said plane at said neutral condition into a braking condition;
    a brake control arrangement including means for communicating a source of pressure with said brake for disengagement thereof and an actuator valve communicating with said means for relieving fluid pressure to said brake and allowing engagement of said brake solely when said control lever assembly is positioned in said braking condition; and
    an overcenter spring mechanism for biasably holding said control lever assembly normal to said plane in either said braking condition or said drive conditions.

2. A transmission and parking brake control system comprising;
    a vehicle;
    a spring-applied, fluid pressure released brake for inhibiting movement of said vehicle;
    a transmission shiftable between neutral and a plurality of drive conditions for operation of said vehicle;
    a transmission control arrangement operatively connected to said transmission for selectively establishing said neutral and said drive conditions including a single control lever assembly shiftable in a plane for selecting said drive conditions and shiftable normal to said plane at said neutral condition into a parking condition;
    a brake control arrangement including means for communicating a source of pressure with said brake for disengagement thereof and an actuator valve communicating with said means for relieving fluid pressure to said brake and allowing engagement of said brake solely when said control lever assembly is positioned in said parking condition; and
    an overcenter spring mechanism for biasably holding said control lever assembly normal to said plane in either said parking condition or said drive conditions.

* * * * *